United States Patent
Ganti et al.

(10) Patent No.: US 7,742,497 B2
(45) Date of Patent: Jun. 22, 2010

(54) ACCESS SYSTEMS AND METHODS FOR A SHARED COMMUNICATION MEDIUM

(75) Inventors: Sudhakar Ganti, Kanata (CA); Bijan Raahemi, Ottawa (CA)

(73) Assignee: Alcatel Lucent, Paris (FR)

( * ) Notice: Subject to any disclaimer, the term of this patent is extended or adjusted under 35 U.S.C. 154(b) by 1783 days.

(21) Appl. No.: 10/861,519

(22) Filed: Jun. 4, 2004

(65) Prior Publication Data

US 2005/0271076 A1    Dec. 8, 2005

(51) Int. Cl.
*H04L 12/413* (2006.01)

(52) U.S. Cl. .................. 370/448; 370/230; 709/232

(58) Field of Classification Search .................. None
See application file for complete search history.

(56) References Cited

U.S. PATENT DOCUMENTS

| | | | | | |
|---|---|---|---|---|---|
| 5,353,287 | A | * | 10/1994 | Kuddes et al. | 370/448 |
| 5,742,592 | A | * | 4/1998 | Scholefield et al. | 370/329 |
| 5,822,538 | A | | 10/1998 | Krishna et al. | |
| 5,852,723 | A | * | 12/1998 | Kalkunte et al. | 709/235 |
| 5,963,560 | A | | 10/1999 | Kalkunte | |
| 6,078,591 | A | * | 6/2000 | Kalkunte et al. | 370/448 |
| 6,122,667 | A | * | 9/2000 | Chung | 709/228 |
| 6,181,708 | B1 | * | 1/2001 | Quackenbush et al. | 370/445 |
| 7,292,598 | B2 | * | 11/2007 | Ho et al. | 370/461 |
| 2004/0004973 | A1 | * | 1/2004 | Lee | 370/445 |

OTHER PUBLICATIONS

DR-Jiunn Deng et al., "A nonpreemptive priority-based access control scheme for broadband ad hoc wireless ATM local area networks" IEEE Journal on Selected Areas in Communications, IEEE Service Center, Piscataway, NJ, vol. 18, No. 9, Sep. 2000.

Gu D et al., "QOS Enhancement in IEEE802.11 Wireless Local Area Networks" IEEE Communications Magazine, IEEE Service Center, New York, NY, vol. 41, No. 6, Jun. 2003.

Draft Amendment to Standard [for] Information Technology—Telecommunications and Information Exchange Between Systems—LAN/MAN Specific Requirements . . . , IEEE P802.11e/D8.0, Feb. 2004.

Gu, Daqing and Jinyun Zhang, "QoS Enhancement in IEEE802.11 Wireless Local Area Networks", IEEE Comm. Magazine, Jun. 2003, pp. 120-124.

\* cited by examiner

*Primary Examiner*—Chi H Pham
*Assistant Examiner*—David Andreasen
(74) *Attorney, Agent, or Firm*—Eckert, Seamans, Cherin & Mellott (57) ABSTRACT

Priority-based access systems and methods for shared communication media are provided. The priority and a corresponding weight of traffic to be transmitted on a shared communication medium are determined. This determination may be made, for example, before a first attempt to transmit the traffic, or before a subsequent traffic transmission attempt following an unsuccessful transmission attempt. The weight controls a rate of change of an exponential delay range limit factor in proportion to a number of attempts to transmit the traffic. The resultant weighted delay range limit factor is used to determine a range of delays from which a delay is selected. A transmission back-off time is then determined based on the selected delay.

37 Claims, 6 Drawing Sheets

| PRIORITY BITS | W (WEIGHT) | DESCRIPTION |
|---|---|---|
| 00 | W > 1 (e.g., W = 1.2) | LOW PRIORITY |
| 01 | W = 1 | EXISTING NETWORKS |
| 10 | W < 1 (e.g., W = 0.6) | HIGH PRIORITY |
| 11 | W = RESERVED | FOR FUTURE USE |

| PRIORITY BITS | W (WEIGHT) | DESCRIPTION |
|---|---|---|
| 00 | W > 1 (e.g., W = 1.2) | LOW PRIORITY |
| 01 | W = 1 | EXISTING NETWORKS |
| 10 | W < 1 (e.g., W = 0.6) | HIGH PRIORITY |
| 11 | W = RESERVED | FOR FUTURE USE |

ACCESS SYSTEMS AND METHODS FOR A SHARED COMMUNICATION MEDIUM

FIELD OF THE INVENTION

This invention relates generally to communications, and in particular to providing access to a shared communication medium.

BACKGROUND

In communication systems in which a communication medium is shared between multiple communication devices, each device should generally be able to access the shared communication medium in order to send traffic. For example, network devices in Ethernet networks use a Carrier Sense Multiple Access with Collision Detection (CSMA/CD) protocol to access a shared communication medium in the form of a bus. In the event that traffic from more than one device is sent to the bus at substantially the same time, a collision is detected and each device randomly selects an integral delay from a range of delays determined on the basis of a number of attempts that have been made to transmit the traffic. A back-off time interval is then calculated, and the traffic is re-transmitted after the back-off time has elapsed.

In this basic Ethernet protocol, however, there is no priority-based access control for the shared bus. All devices, also commonly referred to as stations or nodes, perform the same algorithm to access the bus and perform a back-off when a collision occurs. This makes it difficult to achieve relative or quantitative Quality-of-Service (QoS) guarantees among different devices or applications being executed on such devices.

Some currently known mechanisms for priority-based access to a shared Ethernet bus alter the delay or back-off interval calculation techniques or back-off algorithms. However, these mechanisms tend to over- or under-prioritize high priority traffic relative to low priority traffic, to such an extent that some of these mechanisms effectively reduce the priority of high priority traffic or explicitly pass or rotate medium access permission.

Other techniques provide for multiple re-transmissions without increasing a range from which back-off times are selected. This type of technique effectively defeats one primary purpose of backing off a communication medium after a failed transmission attempt, in that the probability of collision remains substantially the same for subsequent re-transmissions if a back-off time range is not increased at all.

Priority-based medium access control schemes have been proposed for wireless communication networks, in which the shared communication medium is the air. According to one such scheme, a Carrier Sense Multiple Access with Collision Avoidance (CSMA/CA) mechanism controls access to the wireless medium. If the medium is busy, devices defer their own transmission until the end of a current transmission. After deferral, the devices back off exponentially with a random number of time intervals or slots in the range of 0 and a Contention Window (CW), and decrement a back-off counter only while the medium is idle. Once its back-off time has expired, a device starts transmission. Other devices retain their remaining back-off time until the end of current transmission, and when the medium becomes idle again, continue to decrement their back-off counters. As soon as its back-off counter reaches zero, a device can begin transmission. If a collision occurs, the CW is increased, and a new back-off procedure starts.

QoS support in one proposal for wireless networks is realized by the introduction of an Access Category (AC). Each device may have up to four ACs to support eight user priorities specified by a Virtual Local Area Network (VLAN) Tag. A mapping table maps VLAN priorities to ACs such that an AC with higher priority is assigned a shorter CW and thus in most cases, traffic associated with a higher-priority AC will be transmitted before lower-priority traffic. This is achieved by setting CW limits (CWmin and CWmax) to specified values. For further differentiation, a different inter frame space (IFS), according to AC, is also introduced. A device cannot start a CW when the shared communication medium becomes idle until the IFS expires. Table 1 below shows one example of different values of CW and IFS for each AC:

TABLE 1

| AC | CWmin | CWmax | IFS |
|---|---|---|---|
| 0 | CWmin | CWmax | 2 |
| 1 | CWmin | CWmax | 1 |
| 2 | (Cwmin + 1)/2 − 1 | CWmin | 1 |
| 3 | (CWmin + 1)/4 − 1 | (Cwmin + 1)/2 − 1 | 1 |

A device selects a random back-off time based on a CW within the CW limits CWmin and CWmax. Back-off time is then calculated as Random(0, CW)*slot time, where slot time depends upon the physical characteristics of the medium. A back-off timer or counter is decremented each time the channel is sensed idle for one time slot. When the back-off timer or counter reaches zero, the device is ready to transmit.

While this approach supports priority-based access to a shared wireless medium, CW limits are not determined based on exponential limit factors. Unlike the CW limits used in this technique, exponential limit factors have relatively well understood characteristics and performance. The introduction of different IFSs further increases the complexity of this scheme.

SUMMARY OF THE INVENTION

Embodiments of the invention provide priority-based access to a shared communication medium. A weight associated with a priority of traffic is used to control a rate of change of a delay range limit factor relative to a number of transmission attempts.

Modification of a back-off scheme according to embodiments of the invention does not require any changes to existing devices in a network, whereas newer devices can make use of the modification to obtain a relative priority of communication medium access over other devices.

In one aspect, the invention provides a method of accessing a shared communication medium. A priority of traffic to be transmitted on the shared communication medium is determined and a weight based on the priority is applied to an exponential delay range limit factor. The weight controls a rate of change of the delay range limit factor in proportion to a number of attempts to transmit the traffic. A back-off time is calculated based on a delay within a range of delays, which is determined on the bases of a weighted delay range limit factor. The traffic is then re-transmitted on the shared communication medium after the back-off time has elapsed.

In one embodiment, a determination is made as to whether the traffic transmission is successful, and operations of applying a weight, determining a range of delays, calculating a back-off time, and transmitting the traffic after the back-off time has elapsed are performed where the traffic transmission is not successful. Traffic transmission success may be determined, for example, by detecting a collision or determining whether the traffic transmission is acknowledged.

Traffic priority may be determined, for instance, from a priority indication in the traffic, a priority of a traffic source from which the traffic was received, or a priority associated with a particular type of the traffic. A mapping table which maps different traffic priorities to respective weights may be used to determine weights based on priority.

According to one embodiment, the delay range limit factor is the number of traffic transmission attempts. In a related embodiment, the range of delays is defined as (0, $2^{min(x, f(W, attempts)} - 1$) where x is a maximum value of the exponential delay range limit factor, W is the weight, and attempts is the number of traffic transmission attempts. The function f(W, attempts) may be defined as $$f(W, \text{attempts}) = \begin{bmatrix} \text{Integer}(W * \text{attempts}), & (W * \text{attempts}) > 1 \\ 1 & (W * \text{attempts}) \leq 1 \end{bmatrix}.$$

The invention also provides a system for providing access to a shared communication medium, comprising a transmitter and a flow controller. The transmitter is configured to transmit traffic on the shared communication medium. The flow controller is configured to determine a priority of the traffic, to apply a weight based on the priority to an exponential delay range limit factor, the weight controlling a rate of change of the delay range limit factor in proportion to a number of attempts to transmit the traffic, to calculate a back-off time based on a delay within a range of delays determined using a resultant weighted delay range limit factor, and to control the transmitter to transmit the traffic after the back-off time has elapsed.

A memory in the system may store a mapping table which maps different traffic priorities to respective weights. The memory, or another memory, may also provide registers for storing the weight and the delay range limit factor.

There is also provided an interface card for an access device having a plurality of interfaces configured to receive traffic from a plurality of traffic sources. The interface card provides access to a shared communication medium and includes a plurality of transmitters configured to transmit on the shared communication medium traffic received from respective ones of the plurality of interfaces, and a plurality of flow controllers respectively associated with the plurality of interfaces and the plurality of transmitters. Each flow controller is configured to determine a priority of traffic received from its associated interface, to apply a weight based on the priority to an exponential delay range limit factor, the weight controlling a rate of change of the delay range limit factor in proportion to a number of traffic transmission attempts, to calculate a back-off time based on a delay within a range of delays determined using a resultant weighted delay range limit factor, and to control its associated transmitter to transmit the traffic based on the calculated back-off time.

In accordance with another aspect of the invention, an Ethernet communication network access method includes detecting a collision for traffic transmitted in the Ethernet communication network, determining a priority and corresponding weight for the transmitted traffic, calculating a back-off time based on a randomly selected delay, and re-transmitting the transmitted traffic after the back-off time has elapsed. The delay is preferably selected from a delay range defined by an exponential limit factor to which the corresponding weight has been applied to control a rate of change of the limit factor relative to a number of traffic transmission attempts.

The back-off time may, for example, be a product of the delay and a time interval or an integer number of time slots. In the latter case, the back-off time may be decremented once per time slot, or only during time slots in which the Ethernet communication network is idle.

An access device for an Ethernet communication network according to a further aspect of the invention includes a transceiver, configured to transmit and receive traffic on a shared Ethernet communication medium, and a flow controller. The flow controller is configured to detect a collision of transmitted traffic on the shared Ethernet communication medium, to determine a priority of the transmitted traffic and a corresponding weight, and to re-transmit the transmitted traffic after a delay has elapsed. The delay is randomly selected from a delay range defined by an exponential limit factor, the weight controlling a rate of change of the exponential limit factor relative to a number of traffic transmission attempts. A plurality of access devices connected to an Ethernet hub device may thereby share a single Ethernet communication link to which the hub device is connected.

Other aspects and features of embodiments of the present invention will become apparent to those ordinarily skilled in the art upon review of the following description of the specific embodiments of the invention.

BRIEF DESCRIPTION OF THE DRAWINGS

Examples of embodiments of the invention will now be described in greater detail with reference to the accompanying diagrams, in which.

DETAILED DESCRIPTION OF PREFERRED EMBODIMENTS

Figure 1:
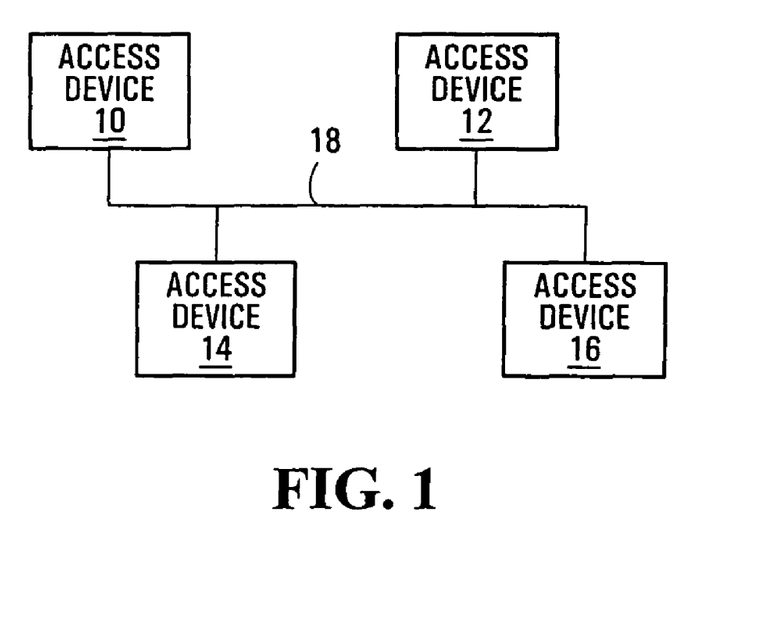
FIG. 1 is a block diagram of a communication system in which the invention may be implemented.

FIG. 1 is a block diagram of a communication system in which the invention may be implemented. The system of FIG. 1 includes multiple access devices 10, 12, 14, 16 and a shared communication medium 18.

The system of FIG. 1, as well as the particular contents of the other Figures, is intended solely for illustrative purposes, and as such, it should be appreciated that the invention is in no way limited thereto. For example, although the shared communication medium 18 is represented as a line in FIG. 1, the invention may be implemented in conjunction with a shared wireless medium. The shared communication medium 18 may also be connected to further communication media or networks for communication with other devices (not shown). Further or fewer access devices and other types of devices may also be provided. Other variations will also be apparent to those skilled in the art.

Any of the access devices 10, 12, 14, 16 may generate or receive from an external device traffic for transmission on the shared communication medium 18. In one embodiment, the access devices 10, 12, 14, 16 are computer systems. Traffic may be generated, for example, by software applications being executed on the access devices 10, 12, 14, 16 or by peripheral devices such as microphones, scanners, or cameras connected to or incorporated into the access devices 10, 12, 14, 16. The access devices 10, 12, 14, 16 need not be dedicated devices and thus may support functions other than communications over the shared communication medium 18.

Traffic to be transmitted on the shared communication medium 18 may include virtually any type of information, including data, text, voice, images, and combinations thereof, for example. Formatting of traffic, such as into packets, frames, or other types of blocks, is dependent upon the type of the shared communication medium 18 and the protocols used for communications thereover. However, the invention is in no way limited to any particular type of traffic or formatting.

In the system of FIG. 1, access control in accordance with an embodiment of the invention is preferably implemented in at least one of the access devices 10, 12, 14, 16 to provide priority-based access to the shared communication medium 18 for that host system. Access control may be provided, for example, by a network card in an access device. In this type of implementation, the network card allows the assignment of priority for multiple peripheral devices, applications, or traffic types with relatively simple configuration of software.

As described briefly above, the shared communication medium 18 may include physical components, a shared bus for instance, or be embodied in a less tangible medium such as in a wireless communication network. In a preferred embodiment, the shared communication medium 18 is an Ethernet bus. Although the shared communication medium 18 may take different forms in different types of communication system, those skilled in the art will appreciate that the shared communication medium 18 may generally be considered a physical layer in widely used reference models or layered architecture models such as the Open Systems Interconnection (OSI) reference model and the CSMA/CD layered architecture model. The access control techniques described below are preferably implemented at a higher architecture layer, such as the OSI data link layer or the CSMA/CD MAC layer.

Operation of access devices 10, 12, 14, 16 in accordance with embodiments of the invention to provide priority-based access to the shared communication medium 18 is described in further detail below.

Figure 2:
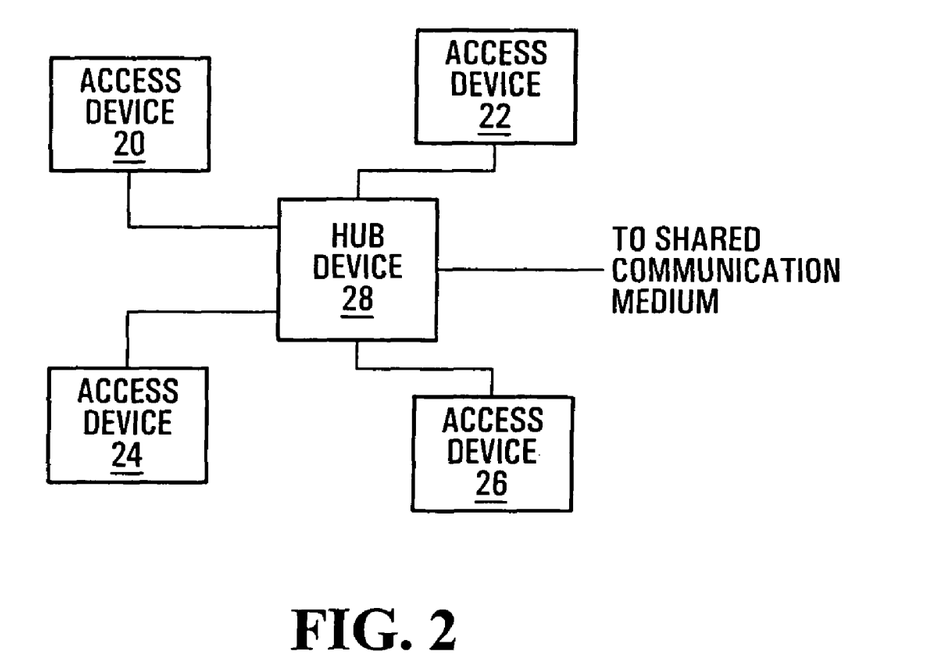
FIG. 2 is a block diagram of another communication system in which the invention may be implemented.

FIG. 2 is a block diagram of another communication system in which the invention may be implemented. As shown, multiple access devices 20, 22, 24, 26 are connected to a hub device 28. The hub device 28 is connected to or otherwise adapted to communicate over a shared communication medium, and thus represents a connection point through which the access devices 20, 22, 24, 26 access the shared communication medium.

The access devices 20, 22, 24, 26 generate or receive traffic to be transmitted on the shared communication medium, and may also support other functions. In FIG. 2, access to the shared communication medium is provided for the devices 20, 22, 24, 26 by the hub device 28. The access devices 20, 22, 24, 26 are computer systems in one embodiment of the invention, and traffic may be generated, for example, by software applications executing on the devices.

In the embodiment shown in FIG. 2, the hub device 28 may be considered to be a part of a shared communication medium. The access devices 20, 22, 24, 26 preferably support priority-based access to a connection, provided by the hub device 28, to a communication medium. Priority-based access may be implemented in any of the access devices 20, 22, 24, 26, and need not be implemented in the hub device 28.

According to another embodiment of the invention, however, the hub device 28 is substantially similar to the access devices 10, 12, 14, 16 of FIG. 1, although an access device configured as the hub device 28 preferably includes multiple ports or interfaces for communication with the devices 20, 22, 24, 26. In this embodiment, the hub device 28 may support priority-based access to the shared communication medium for multiple devices 20, 22, 24, 26, and possibly its own applications or peripheral devices. When priority-based access is provided at the hub device 28, the devices 20, 22, 24, 26 need not support priority-based access.

Thus, an access device may provide access to a shared communication medium for its own traffic, as in the case of the access devices 10, 12, 14, 16 in FIG. 1 and the access devices 20, 22, 24, 26 in FIG. 2, or for external traffic received from other communication devices, possibly in addition to its own locally generated traffic. The latter arrangement represents an alternative embodiment described briefly above, in which an access device is configured as a hub device. References herein to an access device should be interpreted accordingly.

Communications between the devices 20, 22, 24, 26 and the hub device 28 may be enabled through any of multiple types of communication link. For example, physical cables or wireless communication links may be used. As those skilled in the art will appreciate, these communication links may be provided through corresponding compatible interfaces at the devices 20, 22, 24, 26 and the hub device 28.

In accordance with embodiments of the invention, priority-based access to a shared communication medium in a system such as shown in FIG. 2 may be provided by the access devices 20, 22, 24, 26 or by the hub device 28, as described in further detail below with reference to FIGS. 3-5.

Figure 3:
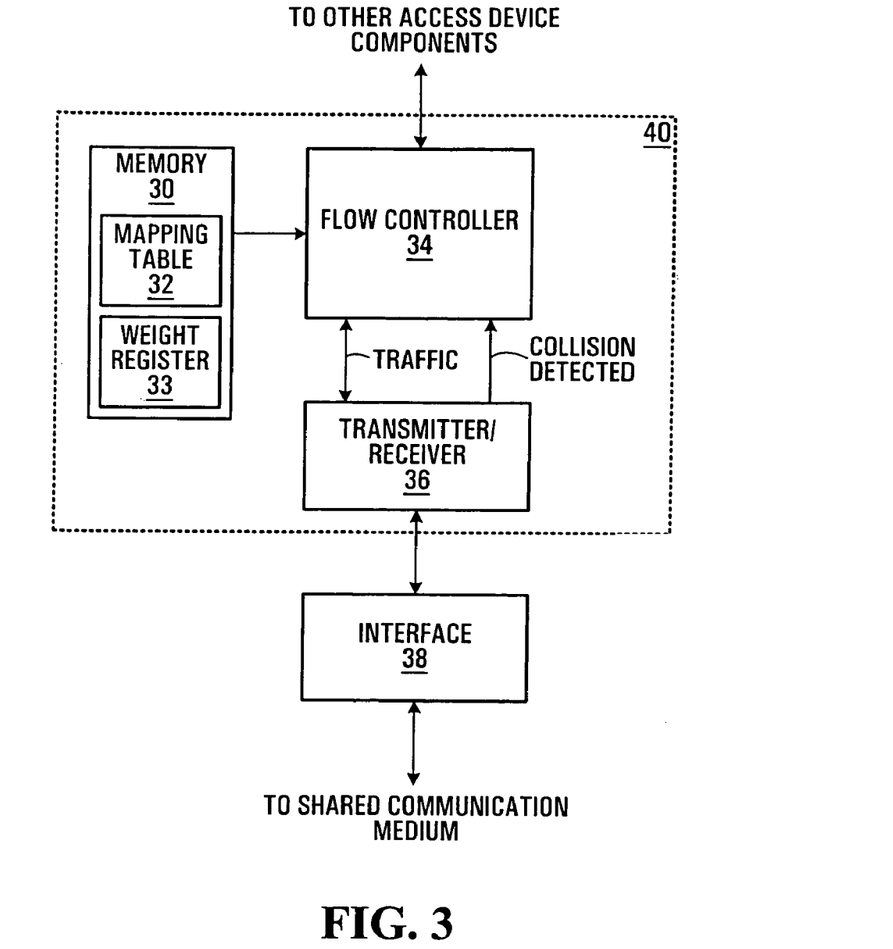
FIG. 3 is a block diagram of a system for providing priority-based access to a shared communication medium according to an embodiment of the invention.

FIG. 3 is a block diagram of a system for providing priority-based access to a shared communication medium according to an embodiment of the invention. The system may be implemented, for example, in any of the access devices in FIGS. 1 and 2, or in a hub device such as 28 of FIG. 2. Where priority-based access is to be provided for multiple traffic sources, multiple access systems are preferably provided in a single access device.

It should be appreciated that only components involved in providing priority-based access to a shared communication medium according to an embodiment of the invention are shown in FIG. 3. An access device incorporating such a system would normally include further components to generate or receive traffic and possibly to support functions other than communications via the shared communication medium. These other components are generally designated in FIG. 3 as "other access device components", and may include, for example, a processor which executes software applications which may generate traffic having different priorities.

The system of FIG. 3 includes a memory 30 storing a mapping table 32 and a weight register 33, a flow controller 34 connected to the memory 30 and to other access device components, a transmitter/receiver 36 connected to the flow controller 34, and an interface 38 which connects the transmitter/receiver 36 to a shared communication medium. The components shown in FIG. 3 may be provided, for example, on a network card or interface card for a computer system.

The memory 30 may be a solid state memory device, such as a Random Access Memory (RAM) or a Read Only Memory (ROM), for storing a priority to weight mapping table 32 and a weight register 33. Many other types of memory devices suitable for implementation of the memory 30 will be apparent to those skilled in the art. As described in further detail below, the mapping table 32 maps traffic priorities to respective weights, stored in the weight register 33 for access by the flow controller 34, which control a rate of increase of a back-off time for traffic transmission.

The flow controller 34 controls access to the shared communication medium as described in further detail below. In one embodiment, the flow controller 34 is implemented at least partially in software. Hardware-based flow controllers are also contemplated, in which registers such as the weight register 33 are used to store values which are read and processed during access control operations, for example.

The transmitter/receiver 36 sends traffic to and receives traffic from the shared communication medium through the interface 38. Traffic formatting and error control are examples of operations that may be performed by the transmitter/receiver 36. In the embodiment shown in FIG. 3, the transmitter/receiver 36 also provides for collision detection, such as by monitoring the shared communication medium or detecting that a traffic transmission has not been acknowledged within a predetermined acknowledge time period. The transmitter/receiver 36, like the flow controller 34, may be at least partially implemented in software.

Although not explicitly shown in FIG. 3, transmit and receive buffers or queues may be provided, in the memory 30 for instance, to store traffic to be transmitted on the shared communication medium and traffic which is received by the transmitter/receiver 36 from the shared communication medium.

The interface 38 may be a connector, plug, port, or similar device which provides a connection to the shared communication medium. For an Ethernet device, for example, the interface 38 includes an Ethernet port which connects to an Ethernet cable. In a wireless network, however, the interface 38 may include an antenna and connector.

As indicated at 40, whereas the interface 36 and the shared communication medium are physical layer components, the memory 30, the flow controller 34, and the transmitter/receiver 36 may be associated with a higher architectural layer. In a system for an Ethernet device, this higher layer is preferably the MAC layer, and as such, the memory 30, the flow controller 34, and the transmitter/receiver 36 may be implemented as a memory, a flow control engine, and transmit and receive engines in a MAC chip. For other types of device, these components may be associated with a data link layer (layer 2) of the OSI reference model, or a layer of some other architecture corresponding to layer 2 or above.

For a hub access device, multiple flow controllers 34 and transmitter/receivers 36 may be provided. Each such flow controller may access the same mapping table 32, or memories or mapping tables may be provided for each flow controller. Similarly, a single interface 38 may be shared by all transmitter/receivers in a hub device, in which case the interface 38 is effectively a part of the shared communication medium, or separate interfaces may be provided.

In operation, traffic for transmission on a shared communication medium is generated or received at a flow controller 34 of an access device. Traffic may include traffic locally generated by a peripheral or application at the access device, or remotely generated traffic in the case of a hub access device. In one embodiment, traffic received by the flow controller 34 has been formatted into packets by a traffic source or a higher layer in an access device architecture.

Depending upon a type of the shared communication medium, for instance, an access device may transmit traffic substantially as it is received or at some time after the shared communication medium is determined to be idle. In CSMA/CA systems, for example, a first attempt to transmit traffic is made after an initial random back-off, whereas in CSMA/CD systems, an access device would normally hold off an initial transmission attempt for a fixed so-called interpacket gap or IPG after the shared communication medium is sensed to be idle. The techniques according to embodiments of the invention may be applied in the calculation of initial back-off times as well as re-transmission back-off times.

In the system of FIG. 3, at least a transmit function of the transmitter/receiver 36 is controlled by the flow controller 34. Transmission control may be provided, for example, by configuring the flow controller 34 to pass traffic to the transmitter/receiver 36 for substantially immediate transmission. In this scheme, the flow controller 34 determines when traffic is to be transmitted, and the transmitter/receiver 36 transmits traffic received from the flow controller 34 as it is received. According to an alternative scheme, traffic to be transmitted on the shared communication medium is stored in a transmit buffer, and the flow controller 34 determines when the traffic should be transmitted and instructs the transmitter/receiver 36 to read the transmit buffer and transmit the traffic. Of course, a transmit buffer may also be used in the former scheme and read by the flow controller 34. In a packet-based network, traffic may be read from the transmit buffer and transmitted one packet at a time.

A determination is then made as to whether the traffic transmission was successful. Such a determination may be based on collision detection or detecting that transmitted traffic has not been acknowledged within an acknowledge time period, for example. In the system of FIG. 3, the transmitter/receiver 36 is configured to detect collisions and to alert the flow controller 34 when a collision is detected. If the transmission is successful, then this process may be repeated for a next block or packet of traffic.

If the transmission is not successful, however, then priority of the traffic is determined. According to an embodiment of the invention, back-off times during which the flow controller 34 backs off the shared communication medium before attempting to transmit the traffic again are dependent upon the priority of the traffic. Each traffic priority level is associated with a respective weight. The weight is then applied to a delay range limit factor to control the rate of change of the factor relative to a number of transmission attempts that have been made for the traffic. A range of delays is determined based on the weighted delay range limit factor, and a back-off time is calculated using a delay within the range of delays. Another attempt to transmit the traffic is made after the back-off time has elapsed, preferably when the medium is sensed to be idle.

Figure 4:
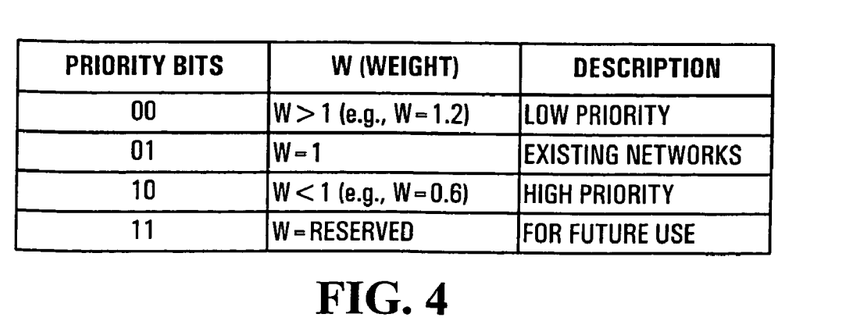
FIG. 4 is a block diagram of an example priority to weight mapping.

FIG. 4 is a block diagram of an example priority to weight mapping. In FIG. 4, two priority bits provide for four priorities, although it should be appreciated that further or fewer priorities may be used for other levels of traffic differentiation. As described briefly above, the weight is preferably used to control a rate of change of a delay range limit factor relative to a number of transmission attempts, such that a weight of 1 represents a directly proportional relationship between a number of attempts and a delay range limit factor.

Consider, for example, CSMA/CD as defined in the IEEE 802.3 Ethernet standard. Those skilled in the art will appreciate that IEEE 802.3 refers to a set of specifications, available from the Institute of Electrical and Electronics Engineers (IEEE), relating to CSMA/CD Ethernet networks. In this type of network, the MAC layer in each node connected to the Ethernet bus performs the following algorithmic steps:

1. Await a packet from the next higher layer to be sent on the bus;
2. Set attempts 0;
3. Wait for silence on the bus (Carrier Sensing-CS);
4. Wait during the IPG of 96 bit-times, then attempt transmission;
5. Monitor the bus for collision (Collision Detection-CD). If the transmission is successful, revert to Step 1. Otherwise, a collision has occurred—proceed to step 6;
6. Increment attempts by 1 (i.e., attempts++);
7. If attempts=16, return failure;
8. Choose a uniform random integer delay between (0 and $2^{min(10, attempts)}-1$);
9. Back-off for delay*slot_time, where a slot_time is 512 bit times;
10. Revert to Step 3.

These steps are followed by the MACs of all nodes in the network (Multiple Access—MA). The back-off time calculation in Step 8 is called "exponential back-off", as the delay increases exponentially with number of unsuccessful attempts. Also note that the same algorithm steps are performed for every packet by each node without giving any considerations to packet or node priority. Due to this, all packets/nodes have equal access to the bus and no quality of service differentiation is made. The number of attempts may be considered a delay range limit factor in this scheme.

Due to increase in speed, versatility and popularity, Ethernet network deployment has increased significantly in recent times. Voice over Internet Protocol (VoIP) applications, for example, which exploit unified IP architectures have been developed for Enterprise networks and other types of networks. IEEE 802.3p architectures that support priority bit marking in packets to indicate a requested priority or class-of-service are also expected to be deployed in the near future. However, IEEE 802.3p priority is used for downstream switching, not for bus access. Although higher priority traffic may be given priority over lower priority traffic for priority queuing at network switches, access to the bus using the above algorithm remains unchanged.

One embodiment of the invention described in further detail below is particularly adapted for Ethernet networks. This embodiment builds on the above algorithm to take traffic priority into account and provide priority-based access to a shared communication medium, but does not require changes to existing network infrastructure to which an access device is connected.

Traffic priority may be dependent upon the type of traffic itself or a source of the traffic. For example, different types of traffic may be assigned different priorities. Since voice traffic is more sensitive to delay than data traffic for instance, voice traffic may be assigned a higher priority than data traffic. Priority assignment may be made by an application which generates the traffic, such as by inserting a priority indicator into the traffic or blocks of traffic.

In a preferred embodiment, traffic is packetized and each packet header includes an indication of priority, illustratively two priority bits for the priority to weight mapping of FIG. 4. According to one such embodiment, traffic priority is determined from an existing priority field or tag or a portion thereof. As described above, IEEE 802.3p provides for priority or class of service requests via a 3-bit VLAN tag. Thus, the priority of packets received by a MAC layer could be determined based on the VLAN tag. Although the VLAN tag is intended for use in downstream switches or other network elements, the priority indicated therein is further exploited for priority-based bus access according to an embodiment of the invention.

It should be appreciated that other schemes may also or instead be used to determine traffic priority. Priority may be inherent in the type of traffic. In this case, a mapping table, a MAC layer, or a higher layer may be configured to map certain traffic types to certain priorities. Traffic including images could be given higher priority than traffic including only text, for instance. Alternatively, traffic priority may be assigned or determined according to the source of the traffic. Where an access device receives traffic for transmission on a shared communication medium from a number of sources, each source may have an associated priority. Traffic generated by a VoIP application may take priority over a browser application. In a hub access device, different ports may have different associated priorities, to provide for priority and thus service differentiation between ports. More than one priority table may be used to control back-off times and thus access to a shared communication medium. For example, respective mapping tables may be established for software applications or sources from which traffic may be received at an access device.

It is also contemplated that mapping tables may added or changed "on the fly", to effectively change the weights assigned to a traffic priority or to add new traffic priorities, for instance.

The invention is therefore in no way limited to a specific traffic priority assignment or determination based on a particular traffic characteristic. Traffic priority may be assigned and determined using any the above schemes, alone or in combination. For example, an access device may have some ports with assigned priority ports in addition to ports without assigned priority. Traffic received on assigned-priority ports has the corresponding priority assigned to the port on which it is received, whereas priority for traffic received on the other ports may be determined based on a priority indicator in the traffic or the type of traffic. Different access devices connected to the same bus need not employ exactly the same priority assignment/determination schemes, although it might be preferred that priority for the same types of traffic should be substantially the same for such access devices. For example, whereas one access device might use assigned-communication medium may rely on priority indications in traffic, voice traffic preferably has the same priority at both access devices.

In a preferred embodiment, a weight, which is determined based on traffic priority, is applied to control the rate of change of a delay range limit factor in proportion to a number of transmit attempts. Thus, back-off calculation is altered to take priority into account. For embodiments adapted for Ethernet networks, each MAC layer preferably performs the steps substantially as described above, except Step 8 is changed to consider a weight W based on priority, for example, as follows:

1-7. Substantially as above;
8. Choose a uniform random integer delay in the range (0, $2^{min(x, f(w, attempts))}-1$), where x, which is 10 in current 802.3 Ethernet networks, sets a maximum value of a delay range limit factor and thus a range of delays; and
9-10. Substantially as above.

According to one embodiment, the function f(W,attempts) is defined as:

$$f(W, \text{attempts}) = \begin{bmatrix} \text{Integer}(W*\text{attempts}), & (W*\text{attempts}) > 1 \\ 1 & (W*\text{attempts}) \leq 1 \end{bmatrix},$$

such that the term "W*attempts" is rounded to the closest integer above 1, or alternatively is truncated to a integer value. If W*attempts≦1, then a value of 1 is chosen.

The result of this or similar assignments according to embodiments of the invention is that back-off time for each re-transmission attempt is not increased as quickly for high priority traffic, thus improving the likelihood of quicker access to a shared communication medium for such traffic. In another embodiment, a similar technique is applied to low priority traffic, except to assign larger back-off time increments using weights greater than 1. Low priority traffic is thus likely to access the medium less frequently.

A random delay is preferably chosen from the uniform distribution Uniform(0, $2^{min(x, f(W, \text{attempts}))}-1$). Other schemes are also possible, for example, by choosing an offset value for the lower limit to be non-zero for various traffic priorities.

Figure 5:
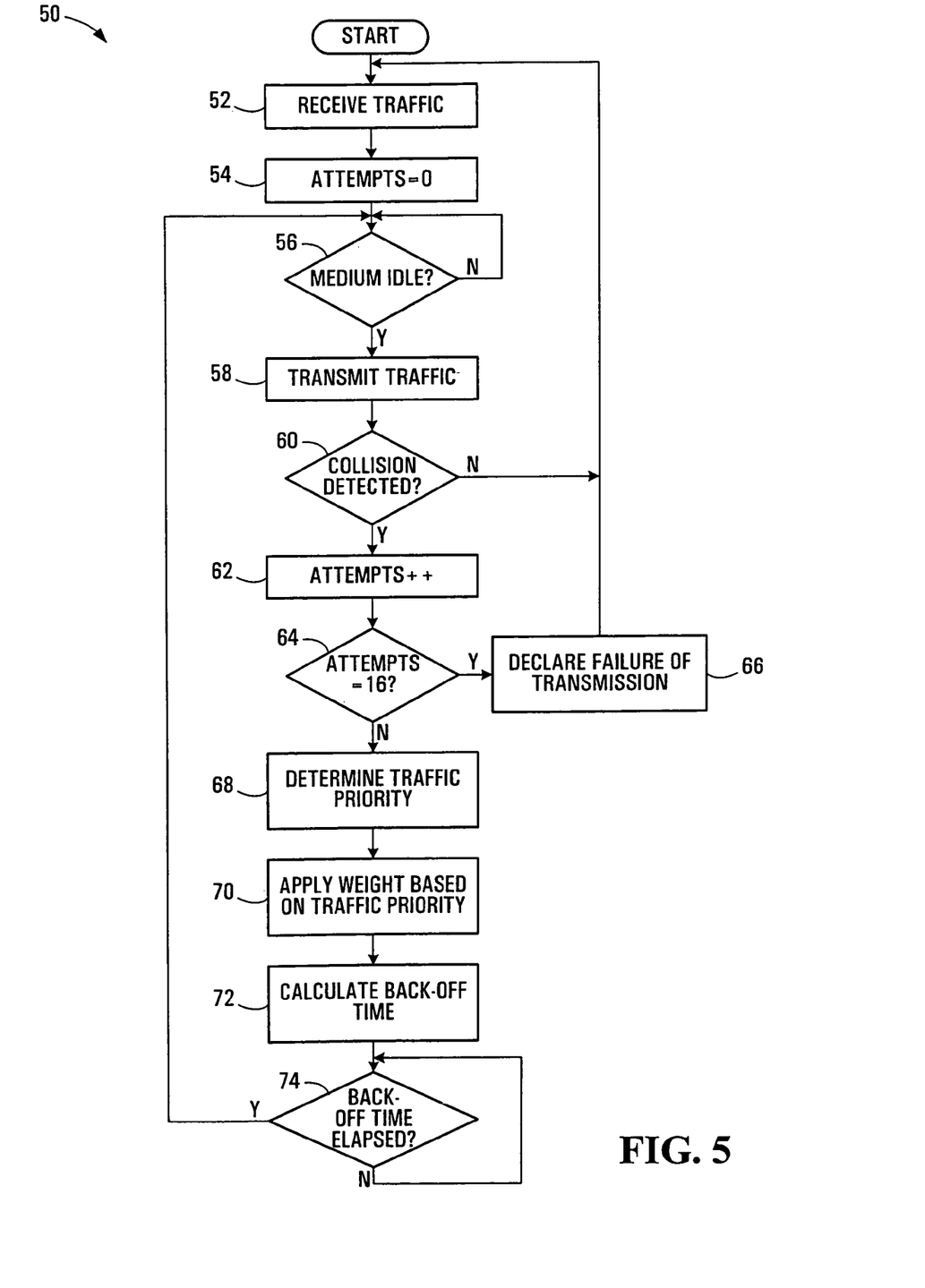
FIG. 5 is a flow diagram of a method of providing priority-based access to a shared communication medium according to an embodiment of the invention.
Figure 6:
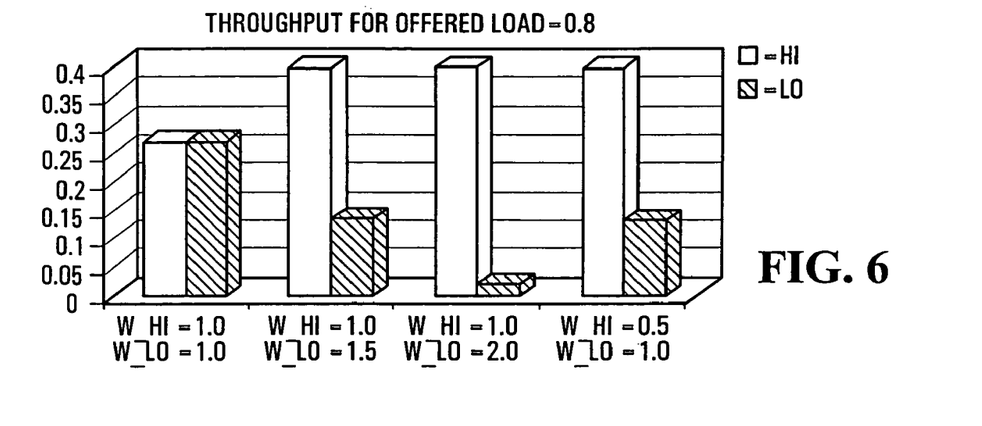
FIGS. 6-11 are example simulation results for embodiments of the invention.
Figure 7:
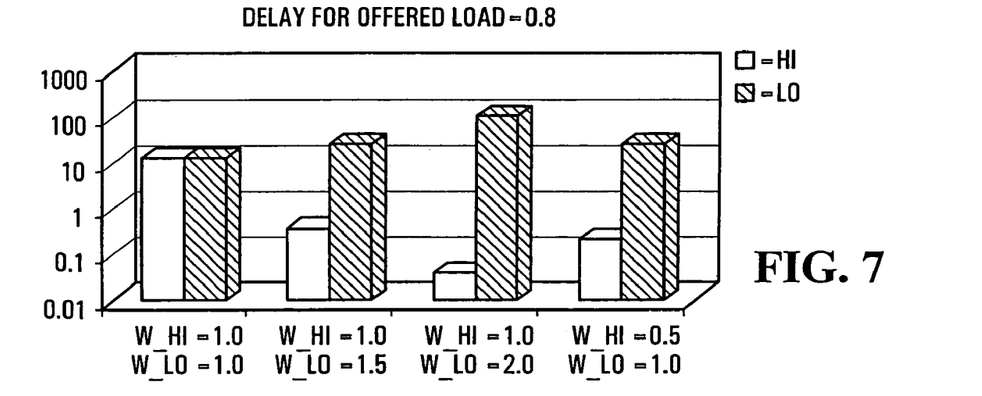
Figure 8:
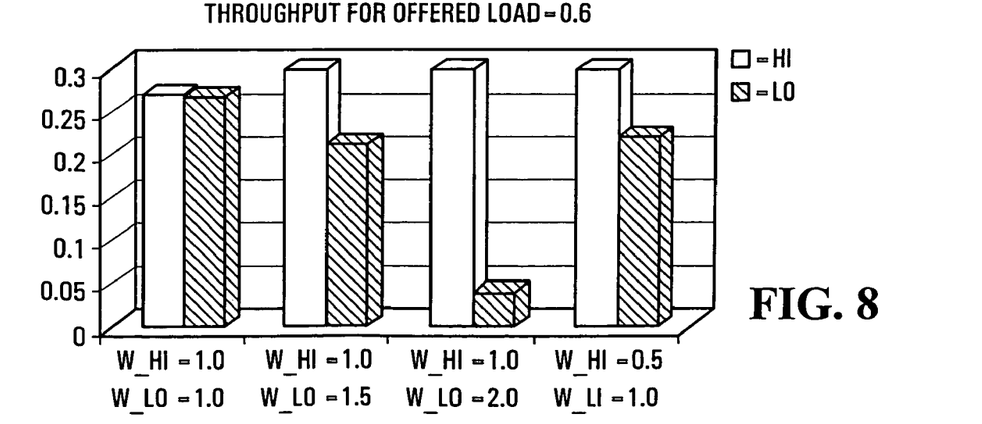
Figure 9:
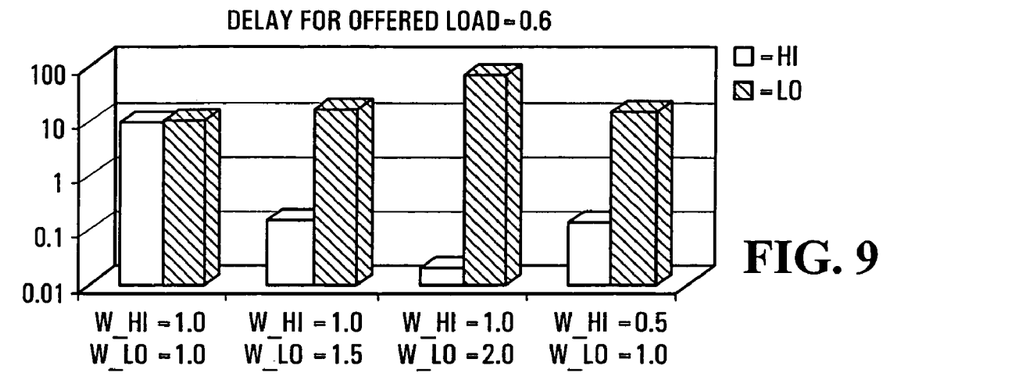
Figure 10:
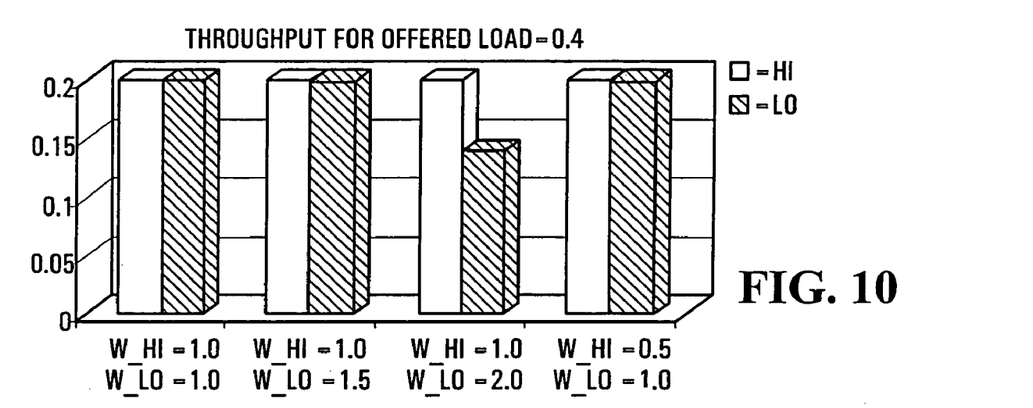
Figure 11:
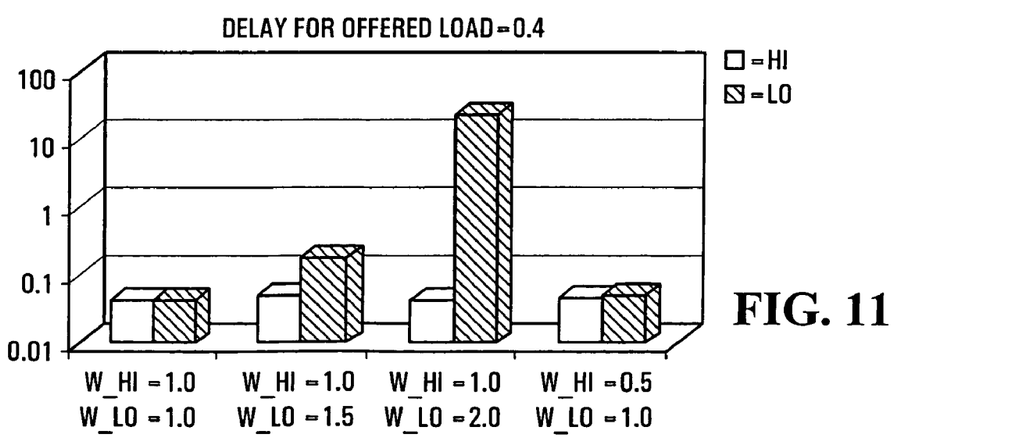

FIG. 5 is a flow diagram of a method 50 of providing priority-based access to a shared communication medium according to an embodiment of the invention.

At 52, traffic for transmission on the shared medium is received from a higher layer. A number of attempts is then set to zero at 54, in an attempts register in the flow controller 34 or the memory 30 (FIG. 3), for example. When the medium is sensed to be idle at 56, the traffic is transmitted at 58. The transmission at 56 may be preceded by an initial hold-off, such as a 96 bit time IPG for instance.

If the traffic transmission is successful, as determined at 60 based on collision detection techniques, then the method is repeated for a next packet or block of traffic. Otherwise, the number of attempts is incremented by one at 62. Where the number of attempts is greater than a maximum number of attempts, as determined at 64, a failure for that traffic transmission is declared at 66. The method 50, although some other maximum number of attempts may be used.

At 68, priority of the traffic is determined, and at 70, a weight, based on the determined traffic priority, is applied to a delay range limit factor. Back-off time is the calculated at 72, as a product between an integer delay selected from a delay range Uniform(0, $2^{min(x, f(W, \text{attempts}))}-1$) and a delay time interval, for example. The operations at 72 may be accomplished using various registers, including the above attempts register and the weight register 33 into which a weight for the priority of the traffic is loaded, for instance. In a preferred embodiment, the delay time interval is a slot time, and a slot time is 512 bit times.

When the back-off time has elapsed, as detected at 74, the method reverts back to 56, and an attempt is made to re-transmit the traffic. The method then proceeds substantially as described above.

The method 50 is intended solely for illustrative purposes. It should also be appreciated that embodiments of the invention may be implemented with further or fewer steps than those explicitly shown in FIG. 5. For example, other error processing techniques may be performed when a transmission fails. The steps shown in FIG. 5 may also be performed in a different order.

Thus, in accordance with embodiments of the invention, delays and back-off times are controlled for various traffic priorities. A related characteristic, Channel Assignment Delay, is defined as the amount of time needed to assign channel access to a ready device whenever the channel (i.e., the shared communication medium) is free and there are one or more devices ready to transmit. This includes the random contention period and is given by:

$$d = 1/S(1-\gamma)T$$

where
  d=Mean Channel Assignment delay;
  T=time slot;
  γ=Fraction of transmissions with no collision; and
  S=probability of successful transmission in the next time slot.

The optimal value of S for ALOHA networks is S=½e=0.18. For slotted ALOHA, the optimal value of S is S=1/e=0.37. The optimal value of S for CSMA-CD is 1/(1+ $2d_{max}*e$), where $d_{max}$ is the maximum propagation delay on the medium, in time slots. For example, assuming that the maximum propagation delay is 0.1 time slot, S=0.65.

As seen from this equation, the Channel Assignment Delay is inversely proportional to the probability of successful transmission (S). Therefore, modifying the random back-off based on priority in accordance with embodiments of the invention provides differentiated channel assignment delay, as it controls the probability of successful transmission (S).

For the purposes of illustration, embodiments of the invention were simulated using a 4 node bus network, such as shown in FIG. 1. In the simulations, two of the access devices were configured to produce low priority packets, while the two other access devices were configured to produce high priority packets, using exponential inter-arrival times. A head-of-the line packet is held in a transmit queue and transmitted as per modified back-off rules based on packet priority.

The simulations covered various offered loads (0.8, 0.6, 0.4) and four cases of weight parameters. The offered loads of 0.8 and 0.6 denote relatively heavy network load, while a load of 0.4 represents a more lightly loaded network. The combinations of weights used for simulation are as follows:
  Case 1: W_Hi=1.0, W_Lo=1.0
    Equal weight to both priorities, no back-off modification, representing existing network deployment.
  Case 2: W_Hi=1.0, W_Lo=1.5
    No back-off modification for high-priority, low priority uses modified back-off with a weight of 1.5.
  Case 3: W_Hi=1.0, W_Lo=2
    No back-off modification for high-priority, low priority uses modified back-off to less aggressively attempt medium access (weight is 2.0) than in Case 2.
  Case 4: W_Hi=0.5, W_Lo=1
    High-priority uses modified back-off, no change for low priority, representing existing deployment for low priority while high-priority uses a more aggressive back-off method.

FIGS. 6-11 are example simulation results for embodiments of the invention and the above simulation conditions. Throughput and delay (in seconds) are illustrated for each of the above offered loads. Of course, for different operating conditions, different results would be expected.

From the simulation results in FIGS. 6-11, it can be observed that without any back-off modification, high and low priority traffic get equal access to the bus (same throughput and delay), as indicated by Case 1 (W_Hi=1.0, W_Lo=1.0). Also, using modified back-off (all other cases), high priority traffic gets quicker access to the bus (higher throughput and lower delay) than low priority traffic (lower throughput and higher delay). The performance for low priority traffic depends upon the chosen weights. Even at lighter loads, embodiments of the invention offer better performance for higher priority traffic, as indicated by throughput and delay figures for the offered load of 0.4 in FIGS. 10 and 11.

It can be concluded from the above analysis and simulations that embodiments of the invention provide priority-based access to a shared communication.

Embodiments of the invention may be implemented, for example, to provide VoIP sources and other high priority access devices and traffic with faster access to a shared communication medium by using W<1.0. As embodiments of the invention in an access device do not affect the operation of other access devices or network elements, existing devices may continue to use conventional techniques, which effectively represent W=1.0. This type of "plug and play" capability requires no configuration use embodiments of the invention automatically get better medium access and thus better delay and throughput performance.

In terms of priority assignment, there are many ways in which embodiments of the invention may be implemented. For example, if an access device produces traffic of a single priority, the weight can be pre-programmed into the access device before deployment of the access device in a network. If an access device produces multiple priorities of traffic, the device can implement multiple network ports, one per priority, and the traffic is appropriately routed to the port with the corresponding weight set. Alternately, the device can implement internally an Ethernet hub that provides the necessary contention mechanism for the priorities to provide access on a single network port.

In a preferred embodiment, the invention is implemented in a differentiated services Ethernet card for a PC. This card could have two or more MAC drivers interconnected to a single physical Ethernet port via an Ethernet hub IC, whereby a single point-to-point Ethernet link to a bridge is shared by traffic of multiple priority levels. This card could be used to support VoIP (high priority) and Internet access (lower priority) applications, for instance. The invention thereby complements hub and spoke topology arrangements because it allows each spoke (Ethernet link) to carry traffic with multiple priorities.

Figure 12:
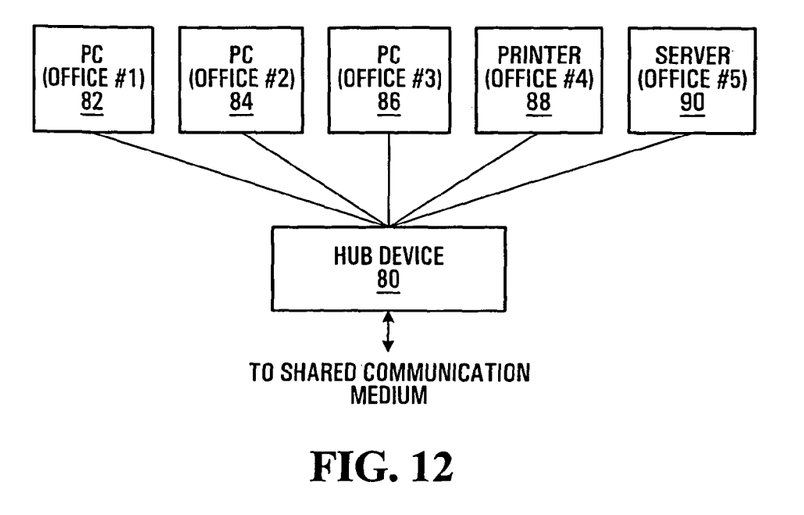
FIG. 12 is a block diagram of a communication system for providing multiple devices with access to a shared communication medium in accordance with an embodiment of the invention.

FIG. 12 is a block diagram of a communication system for providing multiple devices with access to a shared communication medium in accordance with an embodiment of the invention. The system of FIG. 12 is an example of an office network system, in which a hub access device 80, instead of a router, is interconnected with PCs 82, 84, 86, a printer 88, and a server 90. The hub device 80 or any of the devices 82, 84, 86, 88, 90 may be configured to provide priority-based access to a shared communication medium substantially as described above. All of the devices may thereby share a single network connection. In a conventional network, a separate line would be run to each office or piece of equipment. In the system of FIG. 12, priority-based access may also be supported for the connection to the printer 88.

Figure 13:
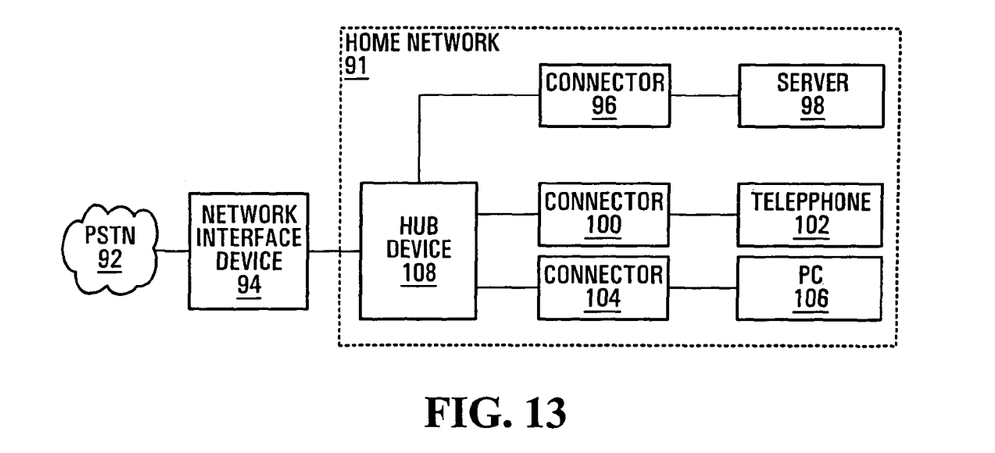
FIG. 13 is a block diagram of a further communication system for providing multiple devices with access to a shared communication medium in accordance with an embodiment of the invention.

FIG. 13 is a block diagram of a further communication system for providing multiple devices with access to a shared communication medium in accordance with an embodiment of the invention. For the example home network 91, equipment 98, 102, 106 is connected through connectors 96, 100, 104, illustratively RJ-45 connectors, to a hub access device 108. As a hub tends to be much less expensive than a router, implementing access mechanisms according to embodiments of the invention at the equipment 98, 102, 106 or the hub device 108 may significantly reduce the cost of implementing priority-based shared communication medium access. The hub device 108 is connected to an external network 92, such as a public switched telephone network (PSTN), through a network interface device 94.

In one possible configuration, a computer system implementing the server 98 has higher priority than the telephone 102 and the PC 106 for access to a single shared connection to the PSTN 92. The telephone 102 is assigned highest priority in another possible configuration.

It should be appreciated that the invention is in no way limited to the particular example systems of FIGS. 12 and 13. Other types of equipment may be connected to an access device and thereby provided with priority-based access to a shared communication medium.

What has been described is merely illustrative of the application of the principles of the invention. Other arrangements and methods can be implemented by those skilled in the art without departing from the spirit and scope of the present invention.

For example, although described above primarily in the context of a MAC device implementation, other types of implementation are also possible. The invention may be implemented in software to be executed by a processor in an electronic device, for example.

We claim:

1. A method of accessing a shared communication medium, comprising:
   determining a priority of traffic to be transmitted on the shared communication medium;
   obtaining a weighted delay range limit factor by applying a weight, in an exponent of an exponential factor for limiting a range of delays, to a number of attempts to transmit the traffic, the weight being based on the priority and controlling a rate of change of the exponent with a change in the number of attempts to transmit the traffic;
   determining a range of delays based on the weighted delay range limit factor;
   calculating a back-off time based on a delay within the range of delays; and
   transmitting the traffic on the shared communication medium after the back-off time has elapsed.

2. The method of claim 1, further comprising:
   determining whether the traffic transmission is successful; and
   repeating the steps of obtaining a delay range limit factor, determining a range of delays, calculating a back-off time, and transmitting the traffic after the back-off time has elapsed, where the traffic transmission is not successful.

3. The method of claim 1, further comprising, before determining a priority:
   transmitting the traffic on the shared communication medium; and
   determining whether the traffic transmission is successful,
   wherein the steps of determining a priority, obtaining a delay range limit factor, determining a range of delays, calculating a back-off time, and transmitting the traffic after the back-off time has elapsed are performed where the traffic transmission is not successful.

4. The method of claim 1, wherein the traffic comprises a priority indication, and wherein determining the priority of the traffic comprises determining the priority indication in the traffic.

5. The method of claim 1, further comprising:
   accessing a mapping table which maps different traffic priorities to respective weights to thereby determine the weight based on the priority.

6. The method of claim 1, further comprising:
receiving the traffic from a traffic source,
wherein determining the priority of the traffic comprises determining a priority of the traffic source.

7. The method of claim 5, wherein the range of delays comprises $(0, 2^{min(x, f(W, attempts))} - 1)$,
where
x is a maximum value of the exponent;
W is the weight; and
attempts is the number of traffic transmission attempts.

8. The method of claim 7, wherein $$f(W, \text{attempts}) = \begin{bmatrix} \text{Integer}(W * \text{attempts}), & (W * \text{attempts}) > 1 \\ 1 & (W * \text{attempts}) \leq 1 \end{bmatrix}.$$

9. The method of claim 2, wherein determining whether the traffic transmission is successful comprises detecting a collision.

10. The method of claim 2, wherein determining whether the traffic transmission is successful comprises determining whether the traffic transmission is acknowledged by an intended receiver of the traffic transmission.

11. A computer readable medium storing instructions which when executed perform the method of claim 1.

12. A system for providing access to a shared communication medium, comprising:
a transmitter configured to transmit traffic on the shared communication medium; and
a flow controller configured to determine a priority of the traffic, to obtain a weighted delay range limit factor by applying a weight, in an exponent of an exponential factor for limiting a range of delays, to a number of attempts to transmit the traffic, the weight being based on the priority and controlling a rate of change of the exponent with a change in the number of attempts to transmit the traffic, to calculate a back-off time based on a delay within a range of delays determined using the weighted delay range limit factor, and to control the transmitter to transmit the traffic after the back-off time has elapsed.

13. The system of claim 12, wherein the flow controller is further configured to determine whether the traffic transmission is successful, and to obtain a weighted delay range limit factor, calculate a back-off time, and control the transmitter to re-transmit the traffic where the traffic transmission is not successful.

14. The system of claim 12, wherein the flow controller is further configured to initially control the transmitter to transmit the traffic, to determine whether the traffic transmission is successful, and, where the traffic transmission is not successful, to obtain a weighted delay range limit factor, calculate a back-off time, and control the transmitter to transmit the traffic after the back-off time has elapsed.

15. The system of claim 12, wherein the flow controller is configured to determine the priority of the traffic based on at least one traffic characteristic selected from the group consisting of: a priority indication in the traffic, a source of the traffic, and a type of the traffic.

16. The system method of claim 12, further comprising:
a memory configured to store a mapping table which maps different traffic priorities to respective weights,
wherein the flow controller is further configured to access the mapping table in the memory to thereby determine the weight based on the priority.

17. The system of claim 12, further comprising:
a plurality of registers, comprising respective registers configured to store the weight and the delay range limit factor.

18. The system of claim 13, wherein the range of delays comprises $(0, 2^{min(x, f(W, attempts))} - 1)$,
where
x is a maximum value of the exponent;
W is the weight; and
attempts is the number of traffic transmission attempts.

19. The system of claim 18, wherein $$f(W, \text{attempts}) = \begin{bmatrix} \text{Integer}(W * \text{attempts}), & (W * \text{attempts}) > 1 \\ 1 & (W * \text{attempts}) \leq 1 \end{bmatrix}.$$

20. The system of claim 13, further comprising:
a receiver configured to detect a collision between the traffic and traffic transmitted by another transmitter configured to transmit traffic on the shared communication medium,
wherein the flow controller determines that the traffic transmission is not successful responsive to a collision detection by the receiver.

21. The system of claim 12, implemented in at least one of a plurality of access devices connected to the shared communication medium.

22. The system of claim 12, implemented in a network card in at least one of a plurality of access devices connected to the shared communication medium.

23. The system of claim 12, implemented in a Media Access Control (MAC) device.

24. The system of claim 12, wherein the shared communication medium is selected from the group consisting of: an Ethernet communication medium and a wireless communication medium.

25. The system of claim 12, comprising a plurality of the transmitters and a respective plurality of the flow controllers.

26. An interface card for an access device having a plurality of interfaces configured to receive traffic from a plurality of traffic sources, the interface card for providing access to a shared communication medium and comprising:
a plurality of transmitters configured to transmit on the shared communication medium traffic received from respective ones of the plurality of interfaces; and
a plurality of flow controllers respectively associated with the plurality of interfaces and the plurality of transmitters, each flow controller being configured to determine a priority of traffic received from its associated interface, to obtain a weighted delay range limit factor by applying a weight, in an exponent of an exponential factor for limiting a range of delays, to a number of attempts to transmit the traffic, the weight being based on the priority and controlling a rate of change of the exponent with a change in the number of traffic transmission attempts, to calculate a back-off time based on a delay within a range of delays determined using the weighted delay range limit factor, and to control its associated transmitter to transmit the traffic based on the calculated back-off time.

27. The interface card of claim 26, wherein each of the plurality of flow controllers is further configured to initially control its associated transmitter to transmit the traffic received from its associated interface, to determine whether the traffic transmission is successful, and, where the traffic transmission is not successful, to obtain a weighted delay range limit factor, calculate a back-off time, and control the transmitter to transmit the traffic based on the calculated back-off time.

28. The interface card of claim 26, wherein each of the plurality of interfaces is assigned a traffic priority.

29. An Ethernet communication network access method comprising:
   detecting a collision for traffic transmitted in the Ethernet communication network;
   determining a priority and corresponding weight for the transmitted traffic;
   calculating a back-off time based on a randomly selected delay; and
   re-transmitting the transmitted traffic after the back-off time has elapsed,
   wherein the delay is selected from a delay range defined by a weighted delay range limit factor obtained by applying the weight, in an exponent of an exponential limit factor for limiting the delay range, to a number of attempts to transmit the traffic, the weight controlling a rate of change of the exponent with a change in the number of traffic transmission attempts.

30. The method of claim 29, wherein calculating comprises calculating a product of the delay and a time interval.

31. The method of claim 30, wherein the back-off time comprises an integer number of time slots, further comprising:
   decrementing the back-off time once per time slot.

32. The method of claim 31, further comprising:
   determining whether the Ethernet communication network is idle,
   wherein decrementing comprises decrementing the back-off time once for each time slot in which the Ethernet communication network is idle.

33. The method of claim 31, wherein the integer number comprises the delay.

34. An access device for an Ethernet communication network, comprising:
   a transceiver configured to transmit and receive traffic on a shared Ethernet communication medium; and
   a flow controller configured to detect a collision of transmitted traffic on the shared Ethernet communication medium, to determine a priority of the transmitted traffic and a corresponding weight, and to re-transmit the transmitted traffic after a delay has elapsed,
   wherein the delay is randomly selected from a delay range defined by a weighted delay range limit factor obtained by applying the weight, in an exponent of an exponential limit factor for limiting the delay range, to a number of attempts to transmit the traffic, the weight controlling a rate of change of the exponent with a change in the number of traffic transmission attempts.

35. The access device of claim 34, wherein the shared communication medium comprises a hub device connected to an Ethernet communication link.

36. The system of claim 34, wherein the weight comprises one of a plurality of weights, the plurality of weights providing different rates of change of the exponent for respective traffic priorities.

37. An Ethernet communication network comprising:
   a plurality of access devices as defined in claim 34,
   an Ethernet communication link; and
   an Ethernet hub device connected to the plurality of access devices and to the Ethernet communication link,
   whereby the plurality of access devices have priority-based access to the Ethernet communication link.

* * * * *